United States Patent Office 3,579,576
Patented May 18, 1971

3,579,576
ORGANOPHOSPHORUS COMPOUNDS AND A PROCESS FOR THE MAKING THEREOF
Howard P. Angstadt, Wilmington, Del., assignor to Sun Oil Company, Philadelphia, Pa.
No Drawing. Filed Feb. 25, 1964, Ser. No. 347,105
Int. Cl. C07f 9/34, 9/30
U.S. Cl. 260—543P                 19 Claims

ABSTRACT OF THE DISCLOSURE

Compounds of the structure (I) 

(II) 

and (III) 
$$\begin{array}{c} R \\ \diagdown \\ P \\ \diagup \\ R \end{array} \begin{array}{c} O \\ \diagup \\ \diagdown \\ OH \end{array}$$

where the R's are alkyl or cycloalkyl groups and X is halogen. Process of preparing these compounds from white phosphorus and an alkyl halide or cycloalkyl halide in a solvent such as carbon disulfide at from $-80°$ C. to $100°$ C. in the presence of any of $AlCl_3$, $AlBr_3$, $BF_3$ $FeCl_3$ or $TiCl_4$ as catalyst followed by hydrolyzing the thus formed product with water at from $0°$ to $50°$ C. to produce the final product which is then separated from the reaction medium. When the alkyl or cycloalkyl halide is primary or secondary compounds of structures II and III as set forth above are formed and when tertiary alkyl or cycloalkyl halides are used compounds of structures I and II are formed.

---

This invention relates in one aspect to a method of preparing the following types of organophosphorus compounds, wherein R is an alkyl or cycloalkyl group and X is a halogen. In the generic identification of each structure below the term alkyl includes alkyls per se and cycloalkyls.

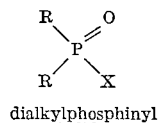    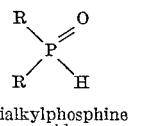    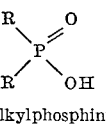

dialkylphosphinyl halide    dialkylphosphine oxide    dialkylphosphinic acid (I)                (II)                (III)

The invention also relates to di-tert-butylphosphinyl halides as new compositions. These new compositions have been found to possess remarkable resistance to hydrolysis and they are far superior in this respect to di-sec-alkyl or di-n-alkylphosphinyl halides. The organophosphorus compounds I, II, and III above are useful as mineral lubricating oil additives and insecticides or as intermediates in the preparation of other mineral lubricating oil additives and insecticides.

The method of the invention involves the reaction of an alkyl halide or cycloalkyl halide with white phosphorus in the presence of a catalyst followed by hydrolysis of the reaction product. The specific products formed depend upon the specific alkyl or cycloalkyl halide employed and, in some cases, the reaction conditions. In order to facilitate description of the method of the following specific embodiment thereof is presented. This specific embodiment is referred to hereafter as Example I.

Into an open flask equipped with stirring means and temperature control is charged a solution of 0.013 mole of white phosphorus in 50 mls. $CS_2$. 0.013 mole of $AlCl_3$ is then charged to the flask while stirring the $CS_2$ solution. The mixture is then brought to and held at $30°$ C. after which 0.0195 mole of tert-butylchloride is added slowly with rapid stirring. After all the alkyl halide has been added the reaction mixture appears as 2 liquid phases. One phase is mainly $CS_2$ while the other phase contains the tert-butylchloride-phosphorus reaction product which may be complexed with the $AlCl_3$. There is no solid $AlCl_3$ in the flask. This two-phase system is stirred for an additional 10 minutes and is then poured over 200 grams of crushed ice contained in a large beaker. The ice melts and a new two-phase liquid system is formed. One phase is $CS_2$ containing organophosphorus compounds dissolved therein. The other phase is water containing aluminum chloride dissolved therein. These two phases are separated and the aqueous phase is twice extracted with 25 ml. portions of $CS_2$ in order to remove any traces of phosphorus compounds from the aqueous phase. The extracts are combined with the $CS_2$ phase and the $CS_2$ plus extracts phase is then dried with $NaSO_4$ after which the CS is evaporated at room temperature to leave an orange colored oil. This oil is dissolved in pentane, charged to an alumina chromatographic column, and is eluted therefrom with a mixture of benzene and chloroform containing 50% by weight of each. A benzene-chloroform solution of di-tert-phosphinyl chloride is eluted from the column first followed by a benzene-chloroform solution of di-tert-butylphosphine oxide. These fractions are recovered separately and the solvent evaporated from each to leave solid residues which are found by analysis to be the above stated compounds. The yields based on the white phosphorus of di-tert-butylphosphinyl chlroide and di-tert-butylphosphine oxide are 7.1% and 4.2% respectively. All yields herein are based on phosphorus and all percentages herein are by weight. Di-tert-butylphosphinyl chloride, a new composition, is a white crystalline solid having a melting point of $80.1°$–$80.9°$ C.

As described, the method of the invention can be considered to involve two steps, reacting an alkyl or cycloalkyl halide with white phosphorus in the presence of a catalyst followed by hydrolysis of the reaction product. The white phosphorus should be employed as a solution in an inert solvent. The solvent is described as inert because it does not enter into any reaction with the alkyl or cycloalkyl halide or phosphorus reactants or with the catalyst. The preferred solvent is $CS_2$ because white phosphorus is highly soluble therein. However, other solvents such as benzene and pentane can be used but they are less preferred because of the relatively low solubility of white phosphorus therein, such solubility being about 3 grams per 100 grams benzene and about 0.7 gram per 100 grams of pentane at room temperature. White phosphorus has a solubility of about 700 grams per 100 grams of $CS_2$ at $10°$ C. and in a commercial operation it would be more economical to use $CS_2$ and thus reduce the amount of solvent required. If the solvent employed is benzene or another aromatic compound, precautions which should be taken to prevent alkylation of the solvent with the alkyl halide are described hereinafter. In the subsequent description of the invention the solvent is assumed to be $CS_2$.

The alkyl or cycloalkyl halide employed has the formula RX wherein R is an alkyl or cycloalkyl group and X is a halogen. X can be any halogen, i.e., Cl, Br, I, or F, but is preferably Cl or Br. R can be any alkyl group such as methyl, ethyl, butyl, hexyl, octyl, etc. or any cycloalkyl such as cyclopentyl, cyclohexyl, cyclobutyl, etc. Alkyl substituted cycloalkyls such as methylcyclopentyl and methylcyclohexyl are defined as cycloalkyls for the present purpose. Preferably the R radical is an alkyl group. As used hereinafter in this disclosure and claims the term alkyl includes both alkyls per se and cycloalkyls except where a distinction is intended in which case it will be specifically pointed out, e.g., alkyl per se, cycloalkyl. Although any type of alkyl halide can be used, the type of organophosphorus products which can ultimately be obtained by the method of the invention depends upon whether the alkyl halide is a primary (otherwise referred to as normal), secondary, or tertiary alkyl halide. This relation between the alkyl halide and products is as follows:

| Type of alkyl halide: | Organophosphorus products which can be obtained |
|---|---|
| Primary | II and III |
| Secondary | II and III |
| Tertiary | I and II |

Preferably the alkyl halide is a tert-alkyl halide such as tert-butylchloride, tert-hexylbromide, 1-chloro-1-methylcyclohexane, tert-amyl chloride. The preferred tert-alkyl per se is tert-butyl and the preferred tert-cycloalkyl is cyclohexyl. Regardless of whether the alkyl halide is normal, secondary, or tertiary, the number of carbon atoms in the alkyl group is preferably 1–20, more preferably 1–12. A tert-alkyl halide and a cycloalkyl halide will have, of course, a minimum of 4 and 3 carbon atoms respectively.

Although in most cases the alkyl halide will be charged as such to the reaction vessel, it can if desired be formed in situ in the vessel. For example, ethylene and hydrogen chloride can be charged to the vessel and then reacted in known manner to form ethyl chloride. The in situ formation of the alkyl halide should be avoided if the reaction resulting in the formation of the alkyl halide also results in the formation of water. Such a reaction would be, for example, the known reaction of tert-butyl alcohol and HCl to form tert-butyl chloride and water. The reason for avoiding in situ formation of the alkyl halide in this case is that the water sometimes tends to deactivate the catalyst.

The materials suitable as catalysts for the present purpose include $AlCl_3$, $AlBr_3$, $FeCl_3$, $TiCl_4$, and $BF_3$. Although these are all Friedel-Crafts type catalysts other catalysts of the same type such as $ZnCl_2$, $CuCl_2$, $HgCl_2$, and $ZrCl_4$ have been found ineffective for the present purpose. The preferred catalysts for the present purpose are $AlCl_3$ and $AlBr_3$.

The amounts of white phosphorus, alkyl halide, and catalyst employed can vary considerably but is best understood with reference to the reaction product formed by reacting the phosphorus with the alkyl halide in the presence of the catalyst. As described in the foregoing specific embodiment such reaction results in a two-phase liquid system, one phase being mainly $CS_2$ and the other phase being a reaction product phase. Although the exact chemical structure of the reaction product phase is not known, several facts are known which indicate the optimum ratio of alkyl halide and catalyst to phosphorus to be employed. The reaction product phase contains the equivalent of 1.5 moles alkyl halide per mole of phosphorus. If the reaction is conducted using a molar ratio in excess of 1.5:1, the excess alkyl halide will be contained in the resulting $CS_2$ phase. Similarly if the molar ratio is less than 1.5:1 the excess phosphorus will be contained in the $CS_2$ phase. Hence the optimum molar ratio of alkyl halide to phosphorus is 1.5:1. Normally the ratio will be in the range of 1:1 to 2:1, although ratios as high as 5:1 or as low as 0.2:1 can also be used. Deviations from a ratio of 1.5:1 do not detract from the operability of the method of the invention but are wasteful in that some phosphorus or alkyl halide will be unconverted for this reason alone to the final product.

Within reasonable limits all the catalyst employed is dissolved in the reaction product phase. Although it is not known with certainty it is believed that at least some of the catalyst exists as a complex with the alkyl halide-phosphorus reaction product. In any event it has been found that as the molar ratio of catalyst to phosphorus increases up to a maximum of 1:1 the yield of product increases. As the amount of catalyst exceeds 1 mole per mole of phosphorus, however, no further substantial increase in yield is obtained. Thus the optimum molar ratio of catalyst to phosphorus is 1:1. In most cases the ratio will be 0.5:1 to 1.5:1 although ratios as high as 5:1 or as low as 0.1:1 can be used. In any event the amount of catalyst should be a catalytically effective amount, i.e., an amount sufficient to cause the alkyl halide and phosphorus to react.

The temperature at which the alkyl halide and phosphorus are contacted can vary considerably but variations in temperature will affect the relative amounts of the final products obtained. The final products obtained depend, as already mentioned, on the type of alkyl halide employed. In all cases the temperature at which the contacting is effected should be in the range of —80° C. to 100° C. Preferably the temperature is in the range of —40° C. to 40° C. As previously described the products obtainable when the alkyl halide is a tert-alkyl halide are I and II, i.e., dialkyl-phosphinyl halides and dialkylphosphine oxides respectively. Within a temperature range of —80° C. to 0° C., lower temperatures favor the formation of II. Within a temperature range of —40° C. to 30° C. the yield of I is approximately constant. The total yield of I and II is maximized at about —40° C. As the temperature increases above 0° C. the yield of II decreases and as it increases above 30° C. the yield of I decreases. To obtain significant yields of product the temperature preferably does not exceed 100° C.

When the alkyl halide is primary or secondary, in which case the products obtained are II and III, the temperature should also be in the range of —80° C. to 100° C. Maximum yields of each are obtained when the temperature is in the range of —40° to 40° C.

The contacting can be carried out under atmospheric, sub or superatmospheric pressure, but preferably it is carried out under a hydrogen halide pressure of 10–650 p.s.i.g., more preferably 25–250 p.s.i.g., wherein the halide in the hydrogen halide is the same as the halide in the catalyst. For example, if the catalyst is $AlCl_3$ the reaction vessel is pressured with HCl, if the catalysts is $AlBr_3$ the vessel is pressured with HBr. The advantage in carrying out the reaction under pressure is increased yield of product. As the hydrogen halide pressure increases from 0 to about 100 p.s.i.g. the yield of product increases. Somewhat over 100 p.s.i.g. the yield starts to decrease until at about 650 p.s.i.g. the yield is about the same as 0 p.s.i.g. The effect of pressure on product yield is shown more clearly in the subsequent examples.

There is essentially no required time of contact of the phosphorus and alkyl halide because the reaction therebetween occurs essentially instantaneously upon contact. For example, if alkyl halide is added to a slurry of the catalyst in a $CS_2$ solution of the phosphorus, the formation of the second liquid phase, i.e., the reaction phase, begins as soon as alkyl halide is added. As additional alkyl halide is added additional reaction product phase forms. By the time the alkyl halide is added the reaction is essentially complete. In most cases, however, a reaction time of 1 minute to 10 hours will be employed.

While the order in which the various reactants are contacted is not critical certain precautions should be observed when the phosphorus solvent is an aromatic compound such as benzene. Some of the catalysts suitable for the present purpose, e.g., $AlCl_3$, are known alkylation catalysts and hence the aromatic solvent could be catalytically alkylated by the alkyl halide. This result is avoided by dissolving the phosphorus in the solvent before contacting the solvent with alkyl halide and catalyst. For example, mixing benzene, alkyl halide and catalyst may effect alkylation of the benzene. On the other hand, mixing a benzene solution of phosphorus, alkyl halide, and catalyst does not result in alkylation of the benzene.

The reaction of the alkyl halide and phosphorus can be carried out in any convenient manner and in conventional type equipment. For example carbon disulfide is charged to a reaction vessel equipped with agitation and temperature control means. The white phosphorus is then added and the mixture stirred until the phosphorus dissolves in the $CS_2$. The catalyst is then added to the solution and the resulting slurry stirred to insure that the catalyst is dispersed throughout the $CS_2$ solution. If the reaction of the alkyl halide and phosphorus is to be carried out under hydrogen halide pressure as previously described, the hydrogen halide is next charged to the reaction vessel until the desired pressure is reached. Lastly the alkyl halide is added. If the alkyl halide is a gas at the reaction conditions, which is most likely to occur with a lower alkyl halide such as methyl chloride, it can be bubbled into the $CS_2$ solution. In such a case the reaction vessel is preferably closed in order to prevent escape of alkyl halide therefrom. If the alkyl halide is a liquid at the reaction conditions it is sufficient to merely slowly add the alkyl halide to the $CS_2$ solution with stirring. Care should be taken not to add the liquid alkyl halide too rapidly because it sometimes forms a gummy mass with a portion of the catalyst. Although reaction of the alkyl halide and phosphorus occurs in spite of this gummy mass, the latter sometimes interferes with any agitation means within the reaction vessel. The reaction between the alkyl halide and phosphorus is very slightly exothermic and a small increase in the temperature of the reaction mass may be observed as the alkyl halide is added. As the alkyl halide is added a second liquid phase begins to form, in addition to the $CS_2$ liquid phase already present, and increases in amount until all the alkyl halide has been added. As the alkyl halide is added and reacts with the phosphorus some hydrogen halide is liberated if the mole ratio of alkyl halide to phosphorus exceeds 1.5:1. If this ratio is less than 1.5:1 no hydrogen halide is liberated. The specific hydrogen halide liberated will depend upon the halide in the alkyl halide reactant. If the reaction vessel is closed any liberated hydrogen halide will be contained within the vessel; if open it will escape therefrom.

The second step in the method of the invention involves hydrolyzing the alkyl halide-phosphorus reaction product. Although the exact composition of the reaction product phase is unknown, it is known that this phase does not contain any of the products of the invention because attempts to isolate these products therefrom have been unsuccessful. If the alkyl halide-phosphorus reaction product is hydrolyzed, however, the products of the invention can be isolated.

Hydrolysis of the alkyl halide-phosphorus reaction product can be effected by contacting the reaction product phase with water. The temperature of the water is not critical but will usually be 0° C. to 50° C. The preferred method of carrying out the hydrolysis step involves contacting with water the entire two-phase liquid system resulting from the first step of the method. Upon such contacting hydrolysis occurs and the initial two-phase liquid system is transformed into a new two-phase liquid system. The new system contains a $CS_2$ phase, i.e., a solvent phase, and a water or aqueous phase. The aqueous phase contains essentially all of the catalyst dissolved therein. The products of the invention are soluble in $CS_2$ (and other white phosphorus solvents) and most of them are dissolved in the $CS_2$ phase although a small amount of product will be dissolved in the aqueous phase. The distribution of the products between the $CS_2$ and aqueous phases is an equilibrium relationship and will vary depending upon, e.g., the specific product. Products I and II are almost totally insoluble in water and hence are present almost entirely in the $CS_2$. Products III has a significant solubility in the aqueous phase, at least when the alkyl groups are lower alkyls such as butyl. As the size of the alkyl groups increases the solubility of III in the aqueous phase decreases. In any event Products III will be distributed between the aqueous phase and the $CS_2$ phase with a substantial amount being in the $CS_2$ phase.

The $CS_2$ phase is next separated from the aqueous phase by, for example, decantation. If desired, any phosphorus compounds in the aqueous phase can be extracted therefrom with $CS_2$ or other suitable solvent such as $CHCl_3$ and the extract combined with the previously separated $CS_2$ phase after which the products of the invention can be recovered from the $CS_2$ phase-extract mixture by, for example, means described hereinafter. This extraction procedure is especially desirable in the case of Product III because III has, as already mentioned, a significant solubility in the aqueous phase. In the case of III it is more effectively extracted from the aqueous phase with chloroform than $CS_2$. Even if chloroform is used the extract is combined with the $CS_2$ phase previously separated.

Although the above method is the preferred method of effecting the hydrolysis it is not the only method which can be employed. Another suitable procedure involves separating the $CS_2$ phase from the $CS_2$-reaction product system which results from the first step of the method of the invention. This can be exected merely by decanting the $CS_2$ phase. The reaction product phase alone is then contacted with water to effect hydrolysis thereof. The result is a liquid aqueous phase containing the catalyst dissolved therein and containing the products of the invention either dissolved therein, dispersed therein as solids or liquids, or both. Products I and II of the invention are essentially insoluble in water and hence will not be dissolved in the aqueous phase beyond trace amounts. Since I and II are solids at the normal hydrolysis conditions they would be expected to be, and sometimes are, dispersed in the aqueous phase as solids. In many cases, however, these products are associated with small amounts of impurities which lower the melting points of the products enough that they are dispersed in the aqueous phase as a liquid. If dispersed as solids the products of the invention can be separated by such means as filtration. If dispersed as either liquids or solids they can be, and preferably are, separated from the water by extraction with a selective solvent such as any of those solvents employed in the first step of the inventive method. If product III is formed it will often be at least partially dissolved in the water but can be extracted therefrom with $CS_2$, etc. as previously described. The solution of the products in the selective solvent is then treated by means described subsequently to isolate the products therefrom. It will now be apparent that it is usually much more convenient to contact the entire reaction product-$CS_2$ two-phase system with water rather than separating the $CS_2$ phase first, contacting the reaction product phase with water, and then adding the $CS_2$ back to the aqueous phase to extract the products.

As described above, the second step of the invention involves hydrolysis of the reaction porduct phase which is effected by contacting the latter with water. Although water per se is a suitable hydrolyzing agent it has been found advantageous to use $H_2O_2$, aqueous $HNO_3$ or aqueous $H_2SO_4$ as the hydrolyzing agent. The advantage which results is increased yield of product. The reason for the increased yield is not known but is believed to be due to the oxidizing nature of these materials. It should be noted, however, that even though these oxidizing materials effect yield improvement the presence of water is essential. In other words, the products of the invention cannot be formed by merely oxidizing the reaction product phase. This was demonstrated by bubbling air through a reaction product phase for an extended period of time. No products of the invention were formed. After this air treatment, however, the same reaction product phase was contacted with water. Products I and II were formed and isolated.

The strength of the $H_2O_2$, aqueous $HNO_3$ or aqueous $H_2SO_4$ is not critical. $H_2O_2$ is, of course, not known except as an aqueous solution and preferably its strength for the present purpose is 1–30%. If aqueous acid is used its strength is preferably 1–40%.

The products of the invention will, as described above, usually be obtained as a solution in a solvent such as $CS_2$. Also as described, the products will be a mixture of II and III in the case of a primary or secondary alkyl halide and in the case of a tertiary alkyl halide reactant will be a mixture of I and II. From the product mixture the individual products can be isolated separately by any convenient procedure, examples of which are as follows:

If the products are a mixture of II and III dissolved in $CS_2$, the $CS_2$ is removed first which leaves a mixture of solid II and solid III or an oily liquid which is also a mixture of II and III. Most products II and III are solids at room temperature but in some cases a mixture of II and III has a melting point below room temperature, hence the oily liquid. In any event the mixture of II and III can be treated in any of several ways to isolate these products separately. One is elution chromatography. The mixture is dissolved in chloroform, charged to an alumina chromotographic column, and is then eluted therefrom with a mixture of equal parts by weight benzene and chloroform. Product II is eluted first followed by product III. Another method of separating II and III involves dissolving the mixture in chloroform, treating the resulting solution with NaOH to convert the phosphinic acid to its sodium salt, and then extracting the latter with water. Acidification of the aqueous extract effects formation of III which can then be recovered by evaporating the aqueous solution to dryness, extraction with chloroform followed by evaporation of the resulting chloroform solution to dryness, etc.

If the products are a mixture of I and II the $CS_2$ is distilled off leaving a residue from which I and II can be isolated separately by elution chromatography. The residue is dissolved in pentane, charged to an alumina chromatographic column, and eulted therefrom with a mixture of equal parts by weight benzene and chloroform. I is eluted first followed by II. A method of separating I and II which can be used when the alkyl groups in these products are tert-butyl and the halogen is chlorine or bromine is selective sublimation at, preferably, 0.1 mm. Hg abs. pressure. Both I and II sublime but I sublimes at a much higher rate, hence the initial vapor is rich in I while at the end of the sublimation the vapor is rich in II. Additional purification of the I and II isolated in this manner can be achieved by subjecting either the sublimate or subliand to an additional sublimation. The reason for conducting the sublimation under reduced pressure is that even though I and II (wherein R is tert-butyl and X is chlorine or bromine) sublime at atmospheric pressure, they do so quite slowly. At reduced pressure the rate of sublimation of each is considerably increased.

It was mentioned previously that the present invention also relates to di-tert-butylphosphinyl halides as new compositions. Preferably the halide is chlorine or bromine, more preferably chlorine. These compounds have unexpected resistance to hydrolysis and are far superior in this respect to di-n- or di-sec-alkylphosphinyl halides. Because of this remarkable resistance to hydrolysis of di-tert-butylphosphinyl halides many important benefits arise. For example, these new compounds can be transported in ordinary containers without resort to special moisture proof containers to prevent hydrolytic decomposition. Another benefit is that when using these compounds as insecticides they can be applied as a water suspension. This is not the case with the di-n- and di-sec-alkylphosphinyl halides since they would be immediately hydrolyzed. The comparative resistance to hydrolysis of di-n, di-sec, and di-tert-butylphosphinyl halides is shown more clearly in the subsequent examples.

The following additional examples further illustrates the invention.

EXAMPLE II

The procedure is the same as in Example I hereinbefore except that the contacting of the white phosphorus solution, tert-butyl chloride, and $AlCl_3$ is at $-40°$ C. instead of 30° C. The chromotographic separation procedure yields the same products as in Example I, namely di-tert-butylphosphinyl chloride and di-tert-butylphosphine oxide.

EXAMPLE III

The procedure is the same as in Example I except that the alkyl halide is tert-butyl bromide and the catalyst is $AlBr_3$. The chromotographic separation procedure yields di-tert-butylphosphinyl bromide and di-tert-butylphosphine oxide. Di-tert-butylphosphinyl bromide is a new compound. It is a white crystalline solid having a melting point of 98.0°–99.0° C.

EXAMPLE IV

The procedure is the same as in Example I except that the catalyst is $FeCl_3$ instead of $AlCl_3$ and the contacting of the white phosphorus solution, tert-butyl chloride and catalyst is at 0° C. rather than 30° C. The separation procedure yields di-tert-butylphosphinyl chloride and di-tert butylphosphine oxide.

EXAMPLE V

The procedure is the same as in Example IV except that the catalyst is $TiCl_4$ instead of $FeCl_3$. The separation procedure yields the same products as in Example IV.

EXAMPLE VI

This example illustrates, inter alia, the formation of the alkyl halide in situ in the reaction vessel. The procedure is the same as in Example I except for the following: After adding the $AlCl_3$ to the $CS_2$ solution the mixture is brought to $-10°$ C. Next 0.0195 mole of isobutylene and 0.0195 mole HCl are added to the bomb. The contents of the bomb is then brought to 80° C. and mixed for 10 minutes. Isobutylene and HCl do not react at $-10°$ C. but at 80° C. they do react to form tert-butyl chloride. The bomb is then opened, the contents thereof poured over 200 gms. ice as in Example I and the procedure of Example I thereafter followed. The chromatographic separation procedure yields di-tert-butylphosphinyl chloride and di-tert-butylphosphine oxide.

EXAMPLE VII

The procedure is the same as in Example I except that the amount of catalyst is 0.0065 mole. Thus the $AlCl_3$: phosphorus mole ratio is 0.5:1 in this example whereas in Example I this ratio is 1:1. The same products are recovered as in Example I. The yield of di-tert-butylphosphinyl chloride is 5% which is somewhat lower than in Example I.

EXAMPLE VIII

This example shows the use of selective sublimation to separate di-tert-butylphosphinyl chloride and di-tert-butyl phosphine oxide. The procedure is the same as in Example I up to and including the formation of the orange colored oil. This oil is placed in the bottom of a flask at room temperature. Within the top portion of the flask is a coiled length of glass tubing through which water at about 0° C. is circulated. The flask is evacuated to 0.1 mm. Hg abs. pressure. Vapor from the oil rises to the top of the flask and is condensed on the glass tubing. After 2 hours the tubing is withdrawn and the solid removed therefrom. It has a melting point of 57°–69° C. This solid is subjected to the sublimation procedure just described and the solid recovered from this second sublimation is again sublimed. The solid recovered from this third sublimation is essentially pure di-tert-butylphosphinyl chloride having a melting point of 80.1°(80.9° C.

EXAMPLE IX

This example is a series of 4 runs showing the increased yield which can be obtained by carrying out the first step of the method of the invention under hydrogen halide pressure as described hereinbefore. The procedure is the same as in Example I except that a closed bomb is used as the reaction vessel and, in addition, the bomb is pressured with HCl after charging the phosphorus solution and catalyst to the bomb but before adding the tert-butyl chloride. The bomb is maintained at a constant HCl pressure during the addition of the alkyl halide and during the 10-minute stirring period after all the alkyl halide has been added. The data presented in Table I below show the HCl pressure employed and the yield of di-tert-butylphosphinyl chloride. The results of Example I are also included since Example I is a run at essentially 0 p.s.i.g. HCl pressure.

Table I

| HCl pressure (p.s.i.g.): | Yield of di-tert-butyl-phosphinyl chloride, percent |
|---|---|
| 0 | 7.1 |
| 25 | 24.0 |
| 50 | 29.0 |
| 200 | 18.0 |
| 600 | 7.5 |

The improved yield obtained by catalytically reacting the alkyl halide and phosphorus under hydrogen halide pressure as described hereinbefore is clearly apparent from the above data.

EXAMPLE X

The procedure is the same as in Example I except that the alkyl halide is n-octyl chloride instead of tert-butyl chloride, the aqueous phase is twice extracted with 25 ml. portions of chloroform rather than $CS_2$, and the residue left after $CS_2$ removal is dissolved in chloroform instead of pentane. The elution chromotographic separation procedure yields as products di-n-octylphosphine oxide and di-n-octyl-phosphinic acid.

EXAMPLE XI

The procedure is the same as in Example X except that the alkyl halide is cyclohexyl chloride instead of n-octyl chloride. Cyclohexyl chloride is, of course, a secondary alkyl halide. The chromotographic separation procedure yields as products di-cyclohexylphosphine oxide and di-cyclohexylphosphinic acid.

EXAMPLE XII

This example shows the high resistance to hydrolysis of di-tert-butylphosphinyl halides and the low resistance to hydrolysis of di-n- and di-sec-butylphosphinyl halides. One gram of di-n-butylphosphinyl chloride is placed in a beaker containing about 300 ml. of water at room temperature. The mixture is mildly agitated. A reaction begins to occur almost immediately and within about 5 minutes all the phosphinyl halide is consumed. The reaction which occurs is the conversion of the phosphinyl halide to a phosphinic acid, viz.

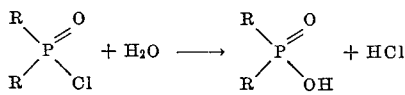

wherein R is n-butyl. The resulting di-n butylphosphinic acid dissolves in the resulting dilute HCl solution.

This hydrolysis test is repeated three times using as the dialkylphosphinyl halides di-n-butylphosphinyl bromide, di-sec-butylphosphinyl chloride, and di-sec-butylphosphinyl bromide. In each case the dialkylphosphinyl halide is consumed within about 5 minutes.

This same hydrolysis test is next repeated two times using di-tert-butylphosphinyl chloride and di-tert-butylphosphinyl bromide. In each case the results are the same and are as follows: No reaction is immediately apparent and the mixture is mildly agitated for 2 hours after which time there still appears to have been no reaction. The mixture is filtered and the recovered solid dried and weighed. Essentially all of the di-tert-butylphosphinyl halide is recovered.

What is claimed is:

1. Method of preparing organophosphorus compounds which comprises contacting a solution of white phosphorus in an inert solvent with an alkyl halide containing 1–20 carbon atoms in the presence of a catalytically effective amount of a catalyst selected from the class consisting of $AlCl_3$, $AlBr_3$, $BF_3$, $FeCl_3$, and $TiCl_4$, said contacting being at a temperature in the range of $-80°$ C. to $100°$ C., whereby the white phosphorus undergoes reaction, hydrolyzing the resulting reaction product, and separating from the hydrolysis product an organophosphorus compound, said compound being selected from the group consisting of dialkylphosphinic acids and dialkylphosphine oxides when said alkyl halide is primary or secondary and being selected from the group consisting of dialkylphosphinyl halides and dialkylphosphine oxides when said alkyl halide is tertiary.

2. Method of preparing organophosphorus compounds which comprises contacting a solution of white phosphorus in an inert solvent with an alkyl halide containing 1–20 carbon atoms in the presence of a catalytically effective amount of a catalyst selected from the class consisting of $AlCl_3$, $AlBr_3$, $BF_3$, $FeCl_3$, and $TiCl_4$, said contacting being at a temperature in the range of $-80°$ C. to $100°$ C., whereby a reaction occurs between said white phosphorus and said alkyl halide and whereby a two-phase liquid system forms, one phase containing mainly said solvent and the other phase containing the product of said reaction, contacting the reaction product phase with water whereby hydrolysis of the reaction product occurs and whereby there is formed a compound which is selected from the group consisting of dialkylphosphonic acid and dialkylphosphine oxides when said alkyl halide is primary or secondary and which is selected from the group consisting of dialkylphosphinyl halides and dialkylphosphine oxides when said alkyl halide is tertiary, and recovering said compound.

3. Method according to claim 2 wherein the entire two-phase liquid system is contacted with water whereby hydrolysis of the reaction product occurs and whereby said two-phase liquid system is transformed into another two-phase liquid system, one phase being an aqueous phase and the other phase being a solvent phase containing dissolved therein an organophosphorus compound selected from the group consisting of dialkylphosphinyl halides, dialkylphosphinic acids, and dialkylphosphine oxides, and recovering said organophosphorus compound from said solvent phase.

4. Method according to claim 2 wherein the solvent phase in said another two-phase liquid system is separated, an organophosphorus compound of said group is extracted from the remaining aqueous phase, the extract is combined with the solvent phase, and an organophosphorus compound of said group is recovered from the extract-solvent phase mixture.

5. Method according to claim 2 wherein said water contains an oxidizing agent selected from the group consisting of $H_2O_2$, $HNO_3$, and $H_2SO_4$.

6. Method according to claim 2 wherein said catalyst is $AlCl_3$.

7. Method according to claim 2 wherein said catalyst is $AlBr_3$.

8. Method according to claim 2 wherein the molar ratio of said alkyl halide to said white phosphorus is in the range of 0.2:1 to 5:1.

9. Method according to claim 2 wherein the molar ratio of said catalyst to said white phosphorus is in the range of 0.1:1 to 5:1.

10. Method according to claim 2 wherein the first mentioned contacting is carried out under a hydrogen halide pressure of 10–650 p.s.i., the halide in said hydrogen halide being the same as the halide in said catalyst.

11. Method according to claim 2 wherein said temperature is in the range of −40° C. to +40° C.

12. Method according to claim 2 wherein said alkyl halide is a tertiary alkyl halide.

13. Method according to claim 12 wherein said temperature in the range of −40 to +40° C.

14. Method according to claim 12 wherein said catalyst is $AlCl_3$.

15. Method according to claim 12 wherein said catalyst is $AlBr_3$.

16. Method according to claim 12 wherein the halide in said tertiary alkyl halide is selected from the group consisting of chlorine and bromine.

17. Di-tert-butylphosphinyl halide.

18. Di-tert-butylphosphinyl chloride.

19. Di-tert-butylphosphinyl bromide.

References Cited

UNITED STATES PATENTS 3,057,917   10/1962   Maier _____ 260—543

OTHER REFERENCES

Kosolapoff, J. Am. Chem. Soc., v. 71, pp. 369–370 (1949).

Pollart et al., Abstract of Papers, 136th Meeting A.C.S. (9/1959), Abstract No. 165, at p. 102P.

Pollart et al., J. Org. Chem., vol. 27, pp. 4444–4447 (1962).

LEWIS GOTTS, Primary Examiner

E. J. GLEIMAN, Assistant Examiner

U.S. Cl. X.R.

260—502.4R, 606.5P; 424—221